Figure 1:
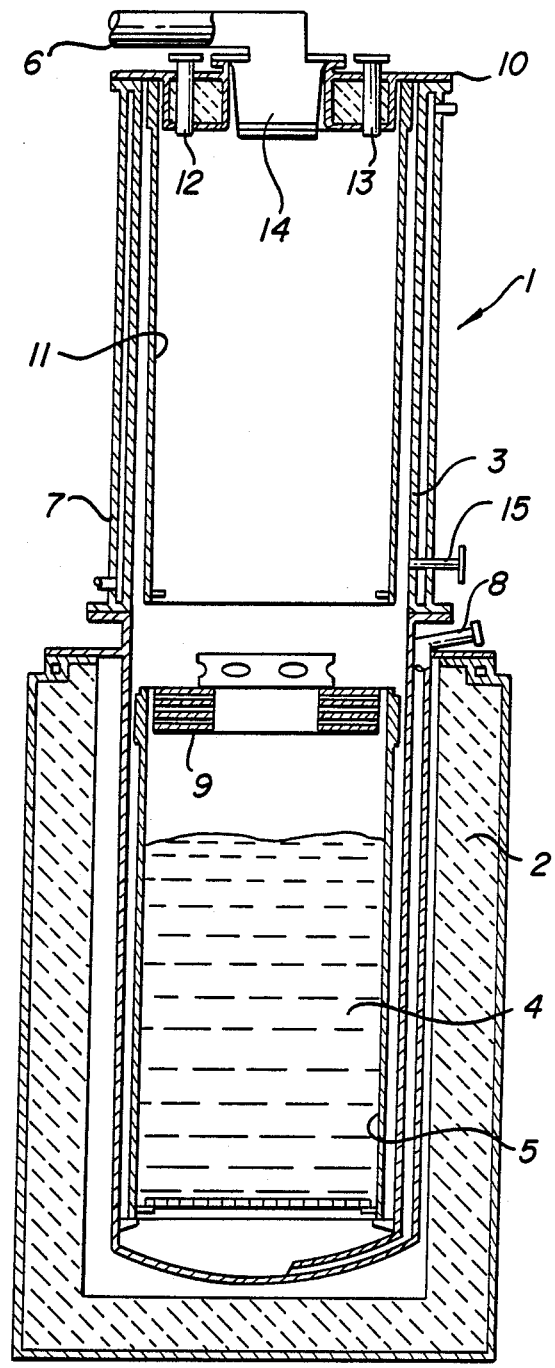

United States Patent [19]

Ishizuka

[11] Patent Number: 4,749,409
[45] Date of Patent: Jun. 7, 1988

[54] METHOD OF PURIFYING REFRACTORY METAL

[76] Inventor: Hiroshi Ishizuka, 19-2, Ebara 6-chome, Shinagawa-ku, Tokyo, Japan

[21] Appl. No.: 90,914

[22] Filed: Aug. 31, 1987

[51] Int. Cl.$^4$ .......................................... C22B 34/12
[52] U.S. Cl. ..................................... 75/84.5; 75/84.4
[58] Field of Search ............................... 75/84.5, 84.4

[56] References Cited

U.S. PATENT DOCUMENTS

| | | | |
|---|---|---|---|
| 3,847,596 | 11/1974 | Holland et al. | 75/84.5 |
| 4,441,925 | 4/1984 | Ishizuka | 75/84.5 |
| 4,527,778 | 7/1985 | Ishizuka | 75/84.5 |
| 4,584,018 | 4/1986 | Ishizuka | 75/84.5 |

Primary Examiner—Stephen J. Lechert, Jr.
Attorney, Agent, or Firm—Larson and Taylor

[57] ABSTRACT

A method of purifying refractory metal, comprising: providing a distillation space, said space comprising both a heatable portion and a condensation portion in communication with each other, and being closed but provided with gas inlet- and gas outlet openings, said degassing opening being located in the condensation portion, placing a mixed deposit of a refractory metal with magnesium metal and magnesium chloride in said heatable portion, heating said deposit under a subatmospheric pressure to temperatures high enough to cause evaporation of magnesium and magnesium chloride, degassing the space through the gas outlet opening, cooling magnesium and magnesium chloride to deposit in the condensation portion, starting introduction of an inert gas, through the gas inlet opening, at a timing where there is a steady, substantially decreased pressure of the thus forming vapor on the order of $10^{-2}$ Torr in the space, keeping supply of the inert gas while degassing through said openings, respectively, so that an increased but still subatmospheric pressure less than 1 Torr is maintained in the space.

6 Claims, 2 Drawing Sheets

METHOD OF PURIFYING REFRACTORY METAL

The present invention relates to a method of purifying refractory metal and, in particular, such metal as titanium and zirconium, for example, by removing the contaminants of magnesium metal (Mg) and magnesium chloride (MgCl$_2$) from a mixed deposit obtained by a so-called Kroll process, in which chloride of such metal is reduced with fused magnesium.

In commercial production of refractory metals, Kroll processes are widely employed. The product metal is usually obtained in mixed deposit with MgCl$_2$ by-product and Mg, remnant of reducing medium. Then the deposit is treated for removing such contaminants by heating to evaporate the Mg and MgCl$_2$, which are then cooled and condensed to solid. The process is most commonly conducted under decreased pressures, with an apparatus such as known from, for example, U.S. Pat. Nos. 3,663,001, 3,684,264 and Japanese patent publication Sho No. 55-36254 (1980). In an earlier stage of the process, magnesium is preferentially removed due to the grater vapor pressure, so efficiently that the pressure inside the apparatus can reach to a level of several tens of millimeters of mercury, even under normal degassing. In the later stage where the magnesium for the major part has been removed and the vapor rising from the deposit principally consists of MgCl$_2$, the process only can proceed very slowly because of the vapor pressure smaller by one order than that of magnesium, resulting in a very high vacuum in the space over a lengthy period of time.

For such vacuum distillation processes to achieve a high quality product at a favorable yield, it is desirable that given the inherent high affinity to oxygen and nitrogen of such metals as titanium and zirconium, the apparatus be completely free of penetration through any leaks of atmospheric air to contaminate the product principally in this later stage when the apparatus is subjected to such a high vacuum as nearly 1 Torr. Actually, there is some deficiency inevitable in airtightness of the system, which is very hard or sometimes impossible to precisely located, especially if the deficiency occurs during an operation. Some deficiency may even be missed in the normal airtightness test, which is conducted in advance by loading the whole system with a compressed air or by means of a leak detector, because of often complicated piping of the degassing system or other components. In addition the test in itself may be neglected as too impractical to conduct, taking too much effort and time.

Another example of the purification of a Kroll process deposit is known from Japanese Patent Publication Sho No. 43-29861. The deposit is heated to elevated temperatures under circulation of inert gas at positive pressures. The Mg and MgCl$_2$ are heated, evaporated and carried away in the stream from the deposit and then cooled, condensed and collected in solid particulates on the filter of cloth. This technique, however, is disadvantageous in that only a small evaporation rate is obtainable as the process is conducted in high pressurized gas, a complicated equipment with troublesome handling is necessary for recovering the duct of contaminants, and the magnesium metal and chloride thus recovered are of too poor a quality to be re-used in another Kroll process.

Therefore one of the principal objects of the invention is to provide a method of purifying refractory metals eliminated of above said drawbacks.

The object has been achieved by the invention wherein the introduction of inert gas to the distillation system is commenced at a timing where pressure has reached 10$^{-2}$ Torr in the system, and the gas is supplied at a rate such that the differential pressure between inside and outside the system decreases but where a subatmospheric pressure is maintained anyway. The gas thus supplied serves to moderate the differential pressure so as to suppress the in-leakage of air through incomplete seals, often inevitable whether because of incomplete construction or occurring accidentally in operations, at joints in the vicinity of the degassing system or at some other parts. When supplied to preferred sites at an axial opposite end of the purification system relative to the degassing duct, the gas, when it passes over the deposit of metal under treatment, serves also as an efficient heat transferring medium to the deposit and promotes the removal of volatile contaminants therefrom. Such effects are also achievable, although lower in performance, when the inert gas is released at an intermediate region of the distillation system.

According to the invention there is provided a method of purifying refractory metal, comprising: providing a distillation space, said space comprising both a heatable portion and a condensation portion in communication with each other, and being closed but provided with gas inlet and gas outlet openings, said degassing opening being located in the condensation portion, placing a mixed deposit of a refractory metal with magnesium metal and magnesium chloride in said heatable portion, heating said deposit under a subatmospheric pressure to temperatures high enough to cause evaporation of magnesium and magnesium chloride, degassing the space through the gas outlet opening, cooling magnesium and magnesium chloride to deposit in the condensation portion, staring introduction of an inert gas, through the gas inlet opening, at a timing where there is a steady, substantially decreased pressure of the thus forming vapor on the order of 10$^{-2}$ Torr in the space, keeping supply of the inert gas while degassing through said openings, respectively, so that an increased but still subatmospheric pressure less than 1 Torr is maintained in the space.

In the invention the inert gas may be introduced and released in either one or more portions of the space: in a vicinity of the outlet opening to the degassing system, in the axial end opposite to such opening, or in an intermediate region just below the condensing system which is arranged above the heated deposit.

In arrangements in which the contaminants are evaporated downwards and condensed upwards by degassing through an outlet arranged atop the space, the inert gas can be introduced within a small distance of the outlet if air-tightness has been secured for the body of the vessel defining said space especially in the joints of the components. This arrangement is convenient as it allows rather a simplified construction, while securing one of the principal effects of the invention: a small increase in pressure in the degassing system, so the pressure difference is decreased over a period where otherwise there is too high a vacuum in the distillation space, and thereby the penetration of atmospheric air from a deficiency in the joints or other members can be effectively suppressed.

The gas, when injected in the opposite end of the space, passes around the deposit to heat and advantageously causes somewhat promoted evaporation of magnesium chloride contaminant, and carries it onto the condenser upwards. Stripped of this or other condensable contaminants, the gas is led outside the space.

It is preferable that such gas be properly heated before released in the space, especially at an end axially opposite to the degassing outlet. Given the smallness of the introduction rate, however, the gas not necessarily needs to be preheated if introduced just below the condenser: the existing vapor of contaminants cannot be cooled to an extent that they are condensed in suspension, but rather the vapor thus cooled a bit with the lower temperature gas may tend to condense on the condenser more readily than without the gas introduction.

The inert gas is supplied at least over a period where magnesium chloride has become the major contaminant to be removed, after magnesium metal for the major part been removed from the product of refractory metal. In such stage of the process the pressure in the space can reach a vacuum level of or less than $10^{-2}$ Torr under normal degassing, while in the earlier stage, vigorously forming vapor of magnesium raises the pressure to the order of even several tends of millimeters of mercury column. It is essential that the inert gas introduction be commenced at a timing where the pressure inside the distillation system has reached a level of $10^{-2}$ Torr; if the introduction is started earlier, the process will end up with a wasteful consumption of inert gas along with insignificant improvement in purification efficiency, while too late the introduction will only result in insufficient improvement in the efficiency.

From the view point of efficiency in overall purification process, the inert gas is optimally supplied at such a rate that the pressure level having achieved just before the onset of the process, usually at something on the order of $10^{-2}$ Torr, for example, is maintained, although a greater pressure, yet negative anyway, up to 1 Torr may be used at the cost of gas economy.

The gas to be introduced to the distillation space substantially comprises argon, with a minor proportion of inevitable impurity.

For practice of the method of the invention, some apparatuses of conventional designs are adaptable with a slight modification. They include U.S. Pat. Nos. 3,663,001, 3,684,264, Japan Kokai Sho No. 58-174530 and Japanese Patent Publication Sho No. 55-36255, to take a few Examples.

The distillation space can be defined in either one of arrangements known from such publications which have a furnace-heated lower portion and coolable upper portion or, inversely, a heatable upper portion and a coolable lower portion in axial alignment, or alternatively, two chambers arranged side-by-side and connected with a heatable traverse duct.

The designs disclosed and illustrated in U.S. Pat. No. 4,565,354 may be advantageously adapted as they are already provided with a duct utilizable as passage for introduction of the gas, which further allows to preheat the gas. In particular, a deposit of metal is purified subsequently in situ in the same vessel where it has been formed. The vessel comprises a duct on and along the cylindrical wall and which in the antecedent process serves for discharging the liquid of magnesium chloride and is idle in the normal purification process. The inert gas may be passed through it while heated with the furnace therearound, thus allowing to save a preheater while the gas is injected to the opposite end of the degassing opening atop.

When no existing passage duct is available to the introduction, a duct is added so as to have an open end in a vicinity of the degassing outlet, in the bottom of the vessel or retort, or in the intermediate region between the deposit and condenser.

The degassing outlet opening can be normally positioned in either the top of the vertical arrangement in which the deposit is heated downwards, or the side-by-side arrangement, and in a bottom of the arrangement which accomodates the deposit upwards.

Advantageously, the invention, whereby the contaminant removal process is conducted at lowered vacuum levels, only requires a simple degassing system without any costly heavy-duty pump. Further, effort and time can be totally saved for the airtightness check of the apparatus prior to the process.

In the process of the invention, although the slightly increased pressure in the distillation space may rather suppress the evaporation of contaminants, the thus provided improvement in thermal conductivity, due to the gas phase, which now exhibits a higher density, works favorably so the net decrease in contaminant removal efficiency is very limited. Further as the increased pressure, on the other hand, effectively minimizes the penetration of air through any leaks, securing product metals of high maintained quality.

Incidentally, the steady introduction of an inert gas may facilitate a quick and proper countermeasure, using the gas, against any trouble when it should occur in the degassing system, which otherwise could result in deteriorated products as contaminated by nitrogen and/or oxygen from the ambient air; the possible damage to the quality and yield of the products can be thus minimized.

Now the invention will be described more in particular in reference with the attached drawing herewith.

Figure 2:
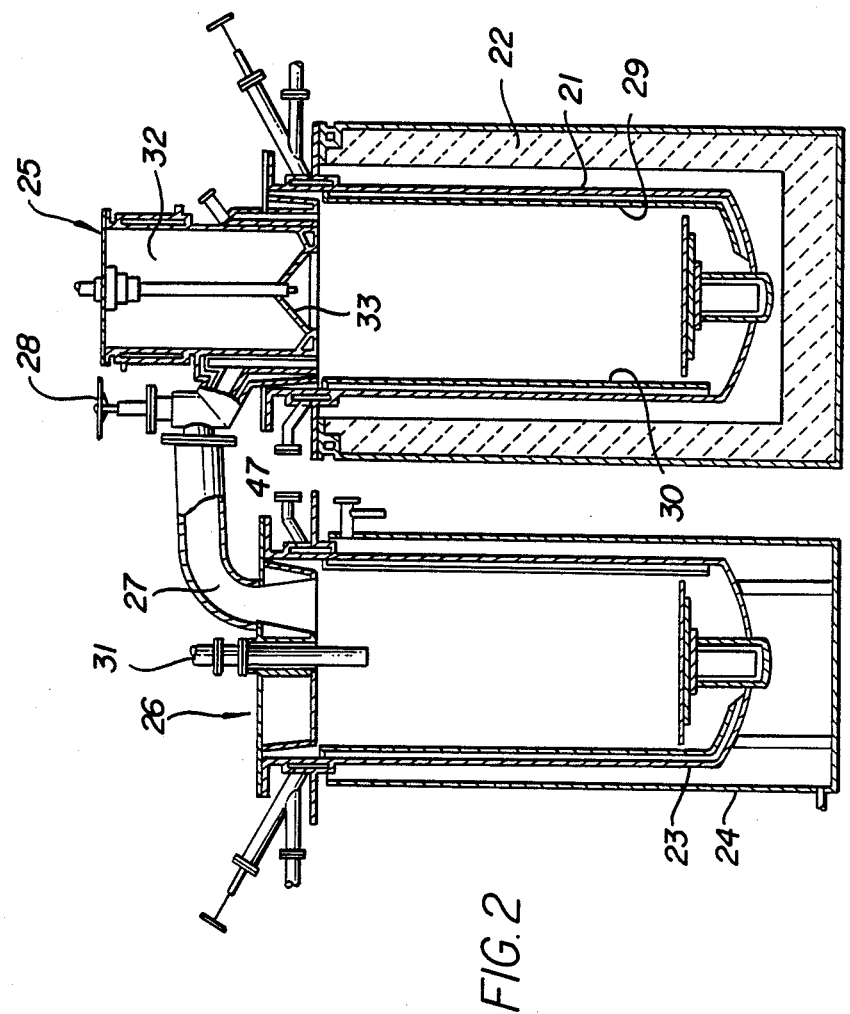

FIGS. 1 and 2 show in section a few examples of apparatuses applicable to the method of the invention. In FIG. 1, in particular, the apparatus, generally designated at 1, comprises an electrical furnace 2 which is so arranged as to surround a lower portion of a vertical cylindrical retort 3, where a mixed deposit 4 of product metal, magnesium metal and chloride, coming in from a Kroll process, is accomodated as held in a reaction crucible 5. The interspace between the retort and furnace is hermetically closable and degassed while in operation by a degassing means (not shown). The upper half of the retort 3 is detachably connected to the lower half and rises above the furnace 2. The upper half is provided with a degassing duct 6 which has an open end 14 at the top and a jacket 7 over the cylindrical wall for passing a coolant water therethrough. An elongated duct 8 is arranged to extend on the retort wall and open in the bottom of the retort for introduction of an inert gas to the retort. In an intermediate region of the retort 3, there is supported detachably a baffle unit 9 for blocking primary radiation of heat from below towards the condensing surface provided upwards for depositing Mg and $MgCl_2$ on the inner surface of a further crucible 11, evacuated, removed of the bottom plate and connected to the top cover 10 with a set of bolts. The top cover 10 has therethrough tubes 12, 13 which each have an open end in an upper portion of the condensation portion which is over the deposit. Although they are essentially provided for use in the Kroll reduction process, either or both of them also may be used, as well as the duct 8, for supplying the inert gas therethrough; even a further tube 15 may be provided so as to have an open end at an intermediate level of the retort 3 or in the vicinity.

To take another example, the side-by-side arrangement of heatable- and condensation portions of FIG. 2 is also applicable to the method of the invention, the design corresponding to the illustration of FIG. 3 of U.S. Pat. No. 4,565,354. Designed for both the reduction of metal chloride with fused magnesium and the subsequent purification step for the product metal, the first vessel 21 for conversion and evaporation is heatable with a furnace 22, while the second vessel for condensation 23 is coolable as arranged in a tank 24 filled with water; they both are closable at the upper end with specific top covers 25, 26, respectively. The vessels 21, 23 are connected with a duct 27; they are separated for the conversion stage or communicated for the purification (distillation) stage by means of a valve 28 provided thereon. Converted from a chloride, the product metal is deposited in the vessel 21, where it may be in situ purified subsequently. For supplying inert gas, ducts 29, 30 are available which are arranged to extend along the vessel 21 and have an open end at low levels thereinside. The vessels are degassed through a duct 31 on the top cover 26. A subcondenser 32 may be favorably provided within the top cover 25, in this particular example, which, as opened by lifting the closure 33, permits a facilitated condensation of the contaminants in this arrangement with an increased passage between the vessels. An operation example with such apparatus is given below:

EXAMPLE

An apparatus of the FIG. 1 construction was used.

In a substantially cylindrical electrical furnace measuring 2 m in I.D. and 4 m in length was arranged a retort lower half, which was 1.6 m in I.D. and 32 mm in thickness, and made of a SUS 316 stainless steel (in JIS designation; equivalent to AISI 316). Some 4 tons of sponge titanium with a minor proportion of magnesium metal and chloride was placed downwards in the retort, as carried in a crucible of a SUS 410 stainless steel (equivalent to AISI 410).

The top cover was joined with bolts to an evacuated crucible, the retort upper half, and the degassing duct, and the whole was joined and settled over the retort lower half, while securing an airtightness. The retort was degassed through the duct at the top, was heated downwards to temperatures between 950° and 1000° C., while the upper half was cooled.

After the treatment at such temperatures for approximately 20 hours, and when the pressure was at a level of $10^{-2}$ Torr, argon gas was allowed to flow in to the bottom of the retort. The rate of introduction was so regulated that the pressure as measured at the top cover was within $2-5 \times 10^{-2}$ Torr. The process was continued for 72 hours to complete the purification.

The purified sponge titanium was analyzed to show impurity levels of: 500 ppm of oxygen, 30 ppm of nitrogen, 120 ppm of magnesium, and 250 ppm of chlorine, and a BHN hardness of 80.

The quality and the required total time of operation are comparable with that achievable with a conventional technique when most highly secured of airtightness by much effort and time.

I claim:

1. A method of purifying refractory metal, comprising: providing a distillation space, said space comprising both a heatable portion and a condensation portion in communication with each other, and being closed but provided with gas inlet and gas outlet openings, said degassing opening being located in the condensation portion, placing a mixed deposit of a refractory metal with magnesium metal and magnesium chloride in said heatable portion, heating said deposit under a subatmospheric pressure to temperatures high enough to cause evaporation of magnesium and magnesium chloride, degassing the space through the gas outlet opening, cooling magnesium and magnesium chloride to deposit in the condensation portion, starting introduction of an inert gas, through the gas inlet opening, at a timing where there is a steady, substantially decreased pressure of the thus forming vapor on the order of $10^{-2}$ Torr in the space, keeping supply of the inert gas while degassing through said openings, respectively, so that an increased but still subatmospheric pressure less than 1 Torr is maintained in the space.

2. The method as claimed in claim 1, in which said inert gas is introduced and released at an axial end of the space opposite to the gas outlet opening of a vertical distillation arrangement.

3. The method as claimed in claim 1, in which said inert gas is introduced and released in an intermediate zone between the heatable and condensation portions.

4. A method as claimed in claim 1, in which said inert gas substantially comprises argon.

5. A method of purifying refractory metal, comprising: providing a distillation space, said space comprising both a heatable portion and a condensation portion in communication with each other, and being closed but provided with gas inlet- and gas outlet openings, said degassing opening being located in the condensation portion, placing a mixed deposit of a refractory metal with megnesium metal and magnesium chloride in said heatable portion, heating said deposit under a subatmospheric pressure to temperatures high enough to cause evaporation of magnesium and magnesium chloride, degassing the space through the gas outlet opening, cooling magnesium and magnesium chloride to deposit in the condensation portion, staring introduction of an inert gas, through the gas inlet opening, at a timing where there is a steady, substantially decreased pressure of the thus forming vapor on the order to $10^{-2}$ Torr in the space, keeping supply of the inert gas by releasing inside the condensation portion from the gas inlet opening at a location close to the gas outlet opening, while degassing through said latter opening so that an increased but still subatmospheric pressure less than 1 Torr is maintained in the space.

6. The method as claimed in claim 5, in which said inert gas substantially comprises argon.

* * * * *